(12) United States Patent
Someno

(10) Patent No.: US 6,462,845 B1
(45) Date of Patent: Oct. 8, 2002

(54) OPTICAL COMMUNICATION DEVICE

(75) Inventor: Yoshihiro Someno, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/264,086

(22) Filed: Mar. 8, 1999

(30) Foreign Application Priority Data

Mar. 16, 1998 (JP) .......................................... 10-065266

(51) Int. Cl.$^7$ ................................................ H04J 14/02

(52) U.S. Cl. ..................................................... 359/124

(58) Field of Search ............................... 359/127, 128, 359/129

(56) References Cited

U.S. PATENT DOCUMENTS

| | | | | |
|---|---|---|---|---|
| 5,363,228 A | * | 11/1994 | DeJule et al. ................ | 359/117 |
| 5,633,741 A | * | 5/1997 | Giles ........................... | 359/124 |
| 5,652,814 A | | 7/1997 | Pan et al. ...................... | 385/24 |
| 5,677,778 A | * | 10/1997 | Kanterakis et al. .......... | 359/117 |
| 5,748,350 A | * | 5/1998 | Pan et al. ..................... | 359/130 |

* cited by examiner

Primary Examiner—Leslie Pascal
Assistant Examiner—Dalzid Singh
(74) Attorney, Agent, or Firm—Brinks Hofer Gilson & Lione

(57) ABSTRACT

Disclosed herein is an optical communication device. Branching filters are placed on a trunk fiber along which light signals of wavelengths $\lambda 3$, $\lambda 4$ and $\lambda 5$ are transmitted in multiplexed form. A transmitting-side branch fiber and a receiving-side branch fiber are respectively placed on the opposite sides of the branching filters. The branching filters both have spectral characteristics in which they reflect the proximity of wavelengths $\lambda 1$ and $\lambda 2$ and pass the wavelengths $\lambda 3$, $\lambda 4$ and $\lambda 5$. A white light source is provided at a termination of the transmitting-side branch fiber and light switches are disposed in the course thereof. The light switches incorporate therein branching filters placed on the optical path when they are turned on and withdrawn from the optical path when they are turned off. One branching filter has a spectral characteristic in which it reflects the wavelength $\lambda 1$ and allows other wavelengths to pass therethrough, whereas the other branching filter has a spectral characteristic in which it reflects the wavelength $\lambda 2$ and passes other wavelengths. On the other hand, a receiver is provided at a termination of the receiving-side branch fiber, and a further branching filter, which reflects the wavelength $\lambda 1$ and passes other wavelengths, is placed in the course thereof. Further, a receiver is provided on the opposite side of the branching filter.

17 Claims, 2 Drawing Sheets

OPTICAL COMMUNICATION DEVICE

BACKGROUND OF THE INVENTION

1. Field of the Invention

The present invention relates to an optical communication device for performing optical communications based on wavelength multiplexing.

2. Description of the Related Art

An optical communication system using optical fibers has recently been put into practical use in place of the telecommunication system for transmitting electric signals with a view toward achieving prevention of electromagnetic noise, an increase in transfer capacity, a weight reduction in system, simplification of work, etc.

As such an optical communication system, there has conventionally been known a network wherein optical fibers are laid in a house, a vehicle, etc. and light signals having a plurality of different wavelengths are multiplexed and transmitted therethrough. When, for example, an in-house network is used, personal computers and AV devices are connected thereto as terminals.

Meanwhile, when signals are newly added to such an already-existing network and optical communications are made in this state, a method is considered which additionally provides a light source like a white light source, for generating a wide band of wavelengths and filters for passing specific wavelengths or reflecting them. However, when the signals are added to the already-existing network by using the white light source, a problem arises in that they constitute noise for the already-existing wavelengths. It is thus necessary to solve this point of view.

SUMMARY OF THE INVENTION

The present invention is constructed such that first and second filters for respectively allowing a first wavelength to pass therethrough and reflecting a second wavelength to be added are placed on an optical transmission line, the first and second wavelengths are multiplexed only on an optical transmission line between the first and second filters, and the second wavelength is set so as not to be transmitted over optical transmission lines other than the optical transmission line referred to above. Since the receiving side for receiving the already-existing first wavelength does not receive the second wavelength if the present invention is constructed in this way, the second wavelength can be prevented from becoming noise.

According to one aspect of this invention, there is provided an optical communication device, comprising: an optical transmission line for transmitting a first wavelength therealong; a light source for emitting light lying within a wide band of wavelengths; a plurality of transmitting means for respectively passing or cutting off a plurality of different second wavelengths other than the first wavelength, lying within the wide band of wavelengths generated from the light source thereby to generate light signals; a first filter for passing the first wavelength and reflecting the second wavelengths thereby to multiplex the first wavelength transmitted through an optical transmission line located on the upstream side and the second wavelengths transmitted through the transmitting means and transmit the resultant band of wavelengths to an optical transmission line located on the downstream side; a second filter for transmitting the first wavelength of the band of wavelengths transmitted from the first filter through the optical transmission line to an optical transmission line located on the downstream side and separating the second wavelengths; and a plurality of receiving means for receiving respective light signals in association with the transmitting means based on the second wavelengths separated by the second filter.

The optical communication device further includes an optical transmission line corresponding to a first branch, for transmitting the band of wavelengths generated from the light source to the first filter through the transmitting means and an optical transmission line corresponding to a second branch, for transmitting the second wavelengths separated by the second filter to the receiving means.

Further, in the optical communication device, a plurality of transmitting means for respectively passing or cutting off a plurality of different second wavelengths thereby to generate light signals are provided on the optical transmission line corresponding to the first branch, and a filter for allowing the plurality of different second wavelengths to branch off and a plurality of receiving means for respectively receiving the respective wavelengths divided by the filter are provided on the optical transmission line corresponding to the second branch.

The optical transmission lines corresponding to the first and second branches are respectively plastic fibers.

Each transmitting means referred to above allows the second wavelength to pass therethrough when turned off and transmits the second wavelength through the optical transmission line. Each receiving means referred to above detects the transmitting means as off upon detection of the second wavelength and detects the transmitting means as on upon non-detection thereof.

The second wavelength referred to above is shorter than the first wavelength.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DESCRIPTION OF THE PREFERRED EMBODIMENTS

Figure 1:
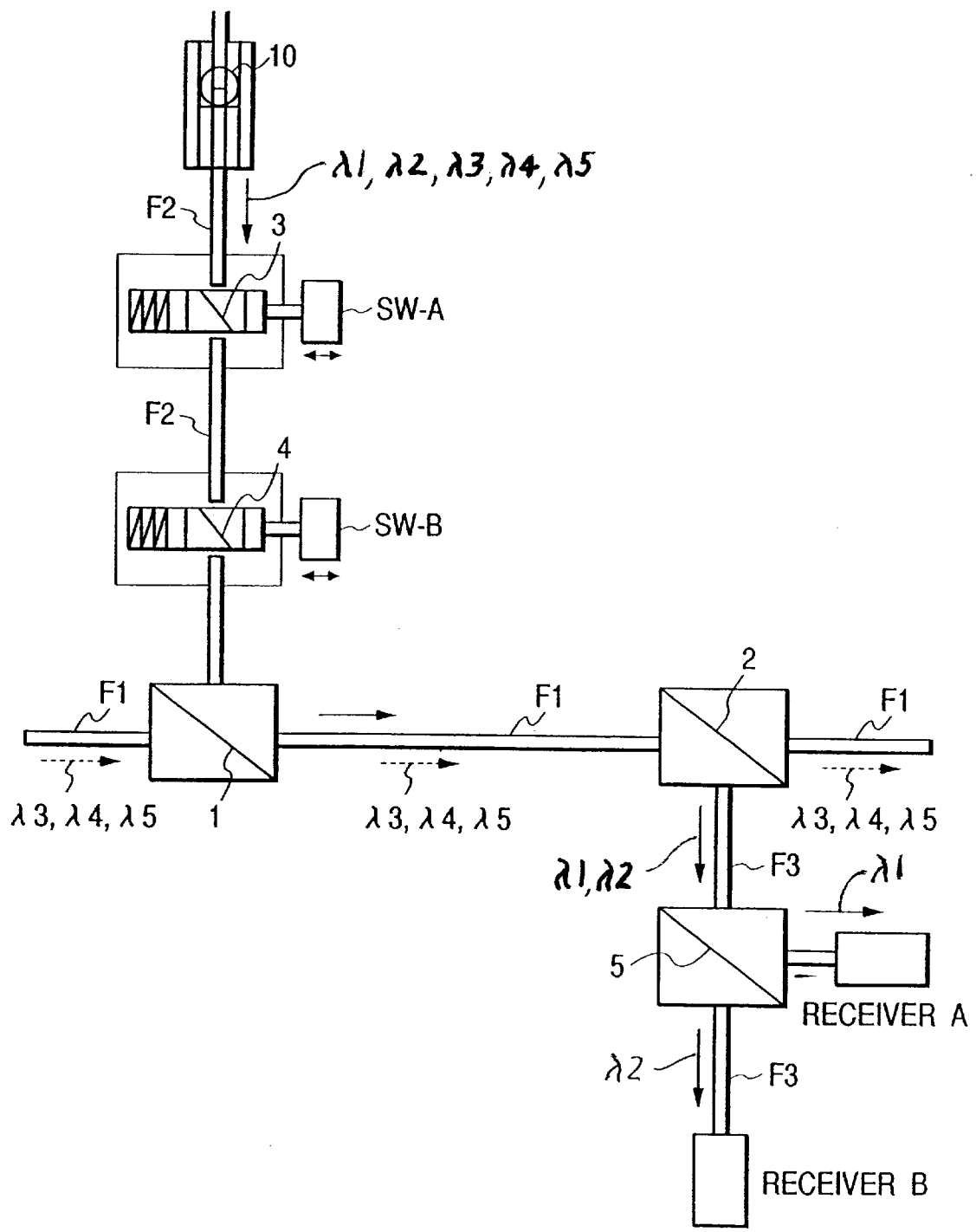
FIG. 1 is a diagram showing a configuration of an optical communication device according to an embodiment of the present invention.

A preferred embodiment of the present invention will hereinafter be described with reference to the accompanying drawings. FIG. 1 is a diagram showing a configuration of an optical communication device, and FIGS. 2A to 2E are diagrams for describing spectral characteristics of a light source and filters, respectively.

Figure 2A:
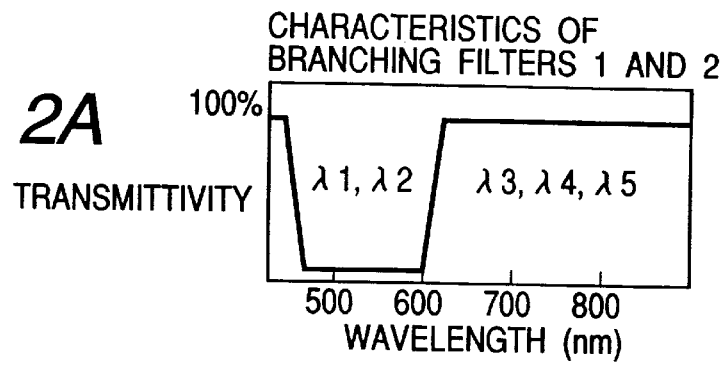
FIGS. 2A to 2E are diagrams for describing spectral characteristics of a light source and filters.

FIG. 1 shows, as one example, a configuration wherein $\lambda 1 = 490$ nm and $\lambda 2 = 580$ nm are added to the already-existing trunk fiber F1 along which light signals having wavelengths $\lambda 3 = 660$ nm, $\lambda 4 = 850$ nm and $\lambda 5 = 1300$ nm are transmitted in multiplexed form, and they are set in multiplexed form. A branching filter 1 and a branching filter 2, both of which have such spectral characteristics that they reflect the neighborhood or proximity of the wavelengths $\lambda 1$ and $\lambda 2$ and allow the wavelengths $\lambda 3$, $\lambda 4$ and $\lambda 5$ to pass therethrough, are placed on the main fiber F1 as shown in FIG. 2A.

Figure 2B:
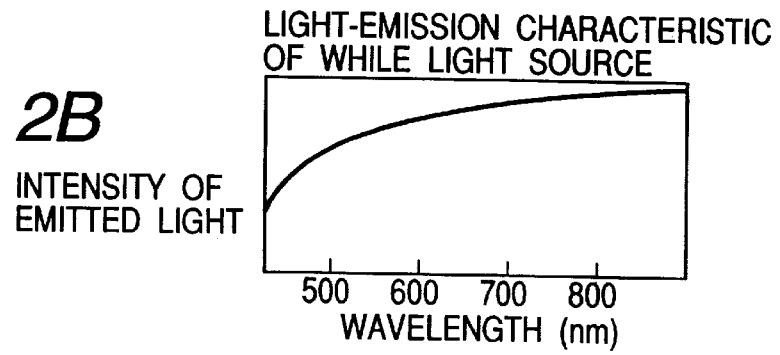

A transmitting-side branch fiber F2 and a receiving-side branch fiber F3 are respectively disposed on the opposite sides of the branching filters 1 and 2. A white light source 10 is provided at a termination of the transmitting-side branch fiber F2. In the course thereof, a light switch SW-A and a light switch SW-B are provided. Now, a luminous or light-emission characteristic of the white light source 10 is generally represented as illustrated in FIG. 2B. Since the intensity of emitted light on the long-wavelength side is slightly higher than that thereof on the short-wavelength side as shown in FIG. 2B, wavelengths shorter than the already-existing wavelengths $\lambda 3$, $\lambda 4$ and $\lambda 5$ are used as the wavelengths $\lambda 1$ and $\lambda 2$ to be added. Further, a relatively expensive Silica fiber and a relatively cheap plastic fiber are known as the type of optical fiber. However, since the plastic fiber has a transmission characteristic excellent for the short-wavelength side, it can be constructed cheap by being used as the branch fibers F2 and F3.

Figure 2C:
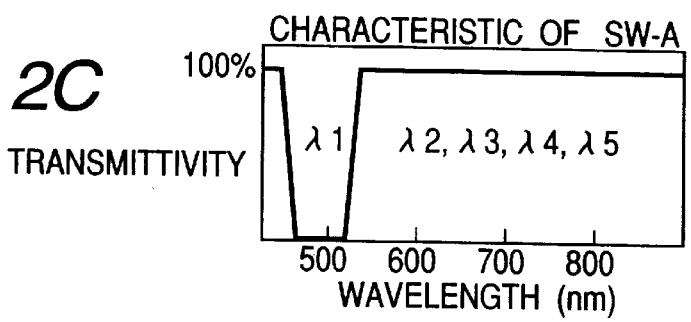
Figure 2D:
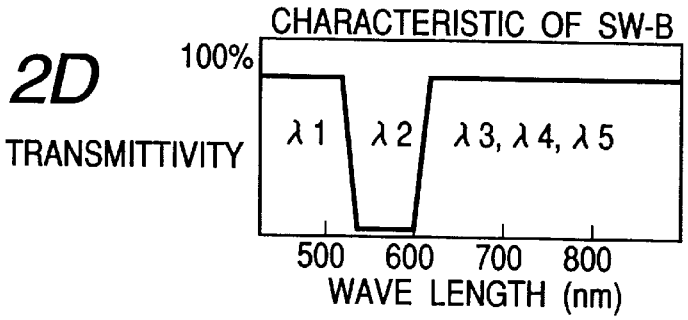
Figure 2E:
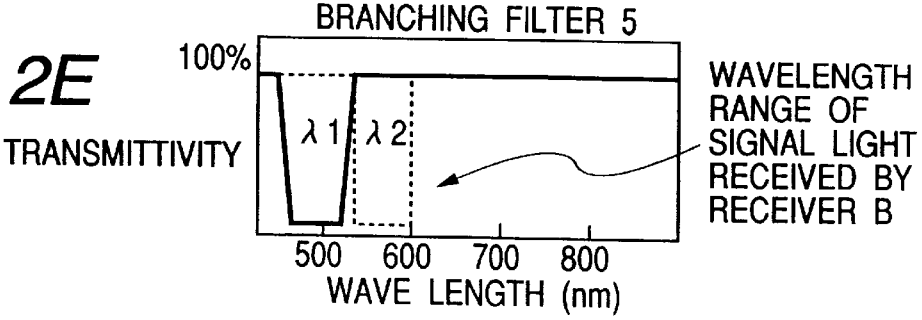

The light switches SW-A and SW-B respectively incorporate therein branching filters 3 and 4 placed on the optical axis when turned on and withdrawn or retreated from the optical path when turned off. As shown in FIG. 2C, the branching filter 3 has a spectral characteristic in which it reflects (cuts) wavelength $\lambda 1$ and allows other wavelengths to pass therethrough. As shown in FIG. 2D, the branching filter 4 has a spectral characteristic in which it reflects the wavelength $\lambda 2$ and passes other wavelengths. A receiver B is placed at a termination of the receiving-side branch fiber F3, and a branching filter 5, which reflects the wavelength $\lambda 1$ and allows other wavelengths to pass therethrough as shown in FIG. 2E, is provided in the course thereof. Further, a receiver A is placed on the reflection side of the branching filter 5.

In the optical communication device constructed in this way, the wavelengths $\lambda 3$, 14 and $\lambda 5$ are multiplexed and transmitted over the already-existing trunk fiber F1. When the light switches SW-A and SW-B are both turned off, i.e., when the branching filters 3 and 4 are retreated from the optical paths respectively, wavelengths including the wavelengths $\lambda 1$ and $\lambda 2$, which are produced from the white light source 10, are transmitted through the transmitting-side branch fiber F2 and pass through the light switches SW-A and SW-B so as to enter into the branching filter 1. Since the branching filter 1 reflects the wavelengths $\lambda 1$ and $\lambda 2$ among the wavelengths $\lambda 1$ to $\lambda 5$ and passes the wavelengths $\lambda 3$, $\lambda 4$ and $\lambda 5$, the wavelengths $\lambda 1$ and $\lambda 2$ are transmitted through the trunk fiber F1. At this time, the already-existing wavelengths $\lambda 3$, $\lambda 4$ and $\lambda 5$ for signals, which are transmitted from the trunk fiber F1 lying on the upstream side of the branching filter 1, pass through the branching filter 1 and are transmitted downstream therefrom.

Next, since the branching filter 2 similarly reflects the neighborhood or proximity of the wavelengths $\lambda 1$ and $\lambda 2$ and allows the wavelengths $\lambda 3$, $\lambda 4$ and $\lambda 5$ to pass therethrough, the wavelengths $\lambda 1$ and $\lambda 2$ are reflected in the direction of the receiving-side branch fiber F3 by the branching filter 2. Since the branching filter 5 reflects the wavelength $\lambda 1$ and allows the wavelength $\lambda 2$ to pass therethrough on the receiving-side branch fiber F3, the wavelength $\lambda 1$ is reflected by the branching filter 5 and detected or received by the receiver A, whereby the off-state of the light switch SW-A is detected. Further, the wavelength $\lambda 2$ is transmitted through the branching filter 5 and received by the receiver B, so that the off state of the light switch SW-B is detected. Since, at this time, the wavelengths $\lambda 1$ and $\lambda 2$ transmitted over the trunk fiber F1 between the branching filters 1 and 2 are reflected by the branching filter 2, they are not transmitted to the trunk fiber F1 located downstream from the branching filter 2. Thus, they make no noise with respect to the wavelengths $\lambda 3$, $\lambda 4$ and $\lambda 5$.

On the other hand, when, for example, the light switch SW-A is turned on and the light switch SW-B is turned off, the branching filter 3 reflects (cuts) only the wavelength $\lambda 1$ of the wavelengths $\lambda 1$ and $\lambda 2$ produced from the white light source 10. Therefore, the wavelengths ($\lambda 2$, $\lambda 3$, $\lambda 4$ and $\lambda 5$) other than the wavelength $\lambda 1$ are transmitted through the branching filter 3 and only the wavelength $\lambda 2$ of the wavelengths ($\lambda 2$, $\lambda 3$, $\lambda 4$ and $\lambda 5$) is reflected by the branching filter 1 and transmitted through the trunk fiber F1. Next, the wavelength $\lambda 2$ is reflected in the direction of from the trunk fiber F1 to the receiving-side branch fiber F3 by the branching filter 2. Further, the wavelength $\lambda 2$ is transmitted through the branching filter 5 on the receiving-side branch fiber F3 and received by the receiver B, so that the off state of the light switch SW-B is detected. Since the wavelength $\lambda 1$ is not received by the receiver A in this case, the on state of the light switch SW-A is detected.

When the light switch SW-A is turned off and the light switch SW-B is turned on, the wavelengths ($\lambda 1$, $\lambda 3$, $\lambda 4$ and $\lambda 5$) other than the wavelength $\lambda 2$, of the wavelengths produced from the white light source 10 are transmitted through the branching filter 4. Only the wavelength $\lambda 1$ of the wavelengths ($\lambda 1$ $\lambda \lambda 3$, $\lambda 4$ and $\lambda 5$) is reflected by the branching filter 1 and transmitted via the trunk fiber F1. Next, since the wavelength $\lambda 1$ is reflected in the direction of the receiving-side branch fiber F3 by the branching filter 2 and the wavelength $\lambda 2$ is not photodetected by the receiver B on the receiving-side branch fiber F3, the on-state of the light switch SW-B is detected. Since the wavelength $\lambda 1$ is reflected by the branching filter 5 and received by the receiver A, the off-state of the light switch SW-A is detected.

Further, when the light switch SW-A and the light switch SW-B are both turned on, the wavelengths ($\lambda 3$, $\lambda 4$, and $\lambda 5$) other than the wavelengths $\lambda 1$ and $\lambda 2$, of the wavelengths from the white light source 10 are transmitted through the branching filters 3 and 4. Further, the wavelengths ($\lambda 3$, $\lambda 4$ and $\lambda 5$) are transmitted through the branching filter 1 and not reflected in the direction of the trunk fiber F1. Accordingly, both the wavelengths $\lambda 1$ and $\lambda 2$ are not received by the receivers A and B so that the on-states of the light switches SW-A and SW-B are detected.

In the above-described embodiment, when the signal is added to the trunk fiber F1 of the already-existing network by using the white light source 10, for example, when the white light source 10 is used in the in-home network to add on and off signals for door chimes, an automatic bath water heater, etc. thereto, the wavelengths $\lambda 1$ and $\lambda 2$ of a wide band of wavelengths generated from the white light source 10 are allowed to selectively pass therethrough on the transmitting-side branch fiber F2 by the light switches SW-A and SW-B and are reflected in the direction of the trunk fiber F1 by the branching filter 1. As a result, the wavelengths $\lambda 3$, $\lambda 4$ and $\lambda 5$ already multiplexed on the trunk fiber F1 and the added wavelengths $\lambda 1$ and $\lambda 2$ can be represented in multiplexed form. Since the wavelengths $\lambda 3$, $\lambda 4$ and $\lambda 5$ already multiplexed only between the branching filter 1 and the branching filter 2 and the added wavelengths $\lambda 1$ and $\lambda 2$ are multiplexed on the trunk fiber F1, and the wavelengths $\lambda 1$ and $\lambda 2$ are not transmitted on an optical transmission line other than the fiber, the added wavelengths $\lambda 1$ and $\lambda 2$ can be prevented from constituting noise for the already-multiplexed wavelengths $\lambda 3$, $\lambda 4$ and $\lambda 5$. Since the wavelengths $\lambda 1$ and $\lambda 2$ are reflected in the direction from the trunk fiber F1 to the receiving-side branch fiber F3 by the branching filter 2 and received by the receivers A and B through the receiving-side branch fiber F3, the on-states of the light switches SW-A and SW-B can be detected.

Incidentally, the above-described embodiment has described the trunk fiber side as the multiple wavelengths. However, the present invention is not necessarily limited to it and can be applied to one in which the trunk side is set as single-wavelength transmission.

The present invention is carried out by the above-described embodiment and can exhibit effects described below.

First and second filters for respectively allowing a first wavelength to pass therethrough and reflecting a second wavelength to be added are placed on an optical transmission line. The first and second wavelengths are multiplexed only on an optical transmission line between the first and second filters. Further, the second wavelength is constructed so as not to be transmitted over optical transmission lines other than the optical transmission line referred to above. As a result, signals can be added to the already-existing network by using a white light source. Further, the added signals can be prevented from constituting noise for the already-existing wavelengths.

While the present invention has been described with reference to the illustrative embodiment, this description is not intended to be construed in a limiting sense. Various modifications of the illustrative embodiment will be apparent to those skilled in the art on reference to this description. It is therefore contemplated that the appended claims will cover any such modifications or embodiments as fall within the true scope of the invention.

What is claimed is:

1. An optical communication device, comprising:
   an optical transmission line for transmitting a first wavelength therealong;
   a light source for emitting light lying within a wide band of wavelengths;
   a plurality of transmitting means for respectively passing or cutting off a plurality of different second wavelengths other than the first wavelength, lying within the wide band of wavelengths generated from said light source thereby to generate light signals;
   a first filter arranged on said optical transmission line for passing said first wavelength and reflecting said second wavelengths thereby to multiplex the first wavelength transmitted through said optical transmission line and the second wavelengths transmitted through said transmitting means and transmit the resultant band of wavelengths to said optical transmission line;
   a second filter arranged on said optical transmission line for passing said first wavelength and reflecting said second wavelengths, thereby transmitting the first wavelength of the band of wavelengths transmitted from said first filter through said optical transmission line to said optical transmission fine and separating the second wavelengths; and
   a plurality of receiving means for receiving respective light signals in association with said transmitting means based on the second wavelengths separated by said second filter.

2. The optical communication device according to claim 1, further including an optical transmission line corresponding to a first branch, for transmitting the band of wavelengths generated from said light source to said first filter through said transmitting means and an optical transmission line corresponding to a second branch, for transmitting the second wavelengths separated by said second filter to said receiving means.

3. The optical communication device according to claim 2, wherein a plurality of transmitting means for respectively passing or cutting off a plurality of different second wavelengths thereby to generate light signals are provided on the optical transmission line corresponding to said first branch, and a filter for allowing said plurality of different second wavelengths to branch off and a plurality of receiving means for respectively receiving the respective wavelengths divided by said filter are provided on the optical transmission line corresponding to said second branch.

4. The optical communication device according to claim 3, wherein said each transmitting means allows the second wavelength to pass therethrough when turned off and transmits the second wavelength through the optical transmission line, and said each receiving means detects said transmitting means as off upon detection of the second wavelength and detects said transmitting means as on upon non-detection thereof.

5. The optical communication device according to claim 4, wherein said each second wavelength is shorter than said each first wavelength.

6. The optical communication device according to claim 3, wherein said each second wavelength is shorter than said each first wavelength.

7. The optical communication device according to claim 2, wherein said optical transmission lines corresponding to said first and second branches are respectively plastic fibers.

8. The optical communication device according to claim 7, wherein said each transmitting means allows the second wavelength to pass therethrough when turned off and transmits the second wavelength through the optical transmission line, and said each receiving means detects said transmitting means as off upon detection of the second wavelength and detects said transmitting means as on upon non-detection thereof.

9. The optical communication device according to claim 8, wherein said each second wavelength is shorter than said each first wavelength.

10. The optical communication device according to claim 7, wherein said each second wavelength is shorter than said each first wavelength.

11. The optical communication device according to claim 2, wherein said each transmitting means allows the second wavelength to pass therethrough when turned off and transmits the second wavelength through the optical transmission line, and said each receiving means detects said transmitting means as off upon detection of the second wavelength and detects said transmitting means as on upon non-detection thereof.

12. The optical communication device according to claim 11, wherein said each second wavelength is shorter than said each first wavelength.

13. The optical communication device according to claim 2, wherein said each second wavelength is shorter than said each first wavelength.

14. The optical communication device according to claim 1, wherein said each transmitting means allows the second wavelength to pass therethrough when turned off and transmits the second wavelength through the optical transmission line, and said each receiving means detects said transmitting means as off upon detection of the second wavelength and detects said transmitting means as on upon non-detection thereof.

15. The optical communication device according to claim 14, wherein said each second wavelength is shorter than said each first wavelength.

16. The optical communication device according to claim 1, wherein said each second wavelength is shorter than said each first wavelength.

17. An optical communication device, comprising:

an optical transmission line for transmitting a first wavelength therealong;

a light source for emitting light lying within a wide band of wavelengths;

a plurality of transmitting means for respectively passing or cutting off a plurality of different second wavelengths other than the first wavelength, lying within the wide band of wavelengths generated from said light source thereby to generate light signals;

a first filter arranged on said optical transmission line for passing said first wavelength and reflecting said second wavelengths, thereby multiplexing said first wavelength and the second wavelengths transmitted through said transmitting means on the optical transmission line;

a second filter arranged on said optical transmission line for passing said first wavelength and reflecting said second wavelengths, thereby separating said second wavelengths in the band of wavelengths transmitted from said first filter through said optical transmission line; and a plurality of receiving means for receiving respective light signals in association with said transmitting means based on the second wavelengths separated by said second filter.

* * * * *